April 11, 1967 M. B. MALLETT ET AL 3,313,983
TRANSFORMERS
Filed Aug. 27, 1965 4 Sheets-Sheet 1
FIG. 1.
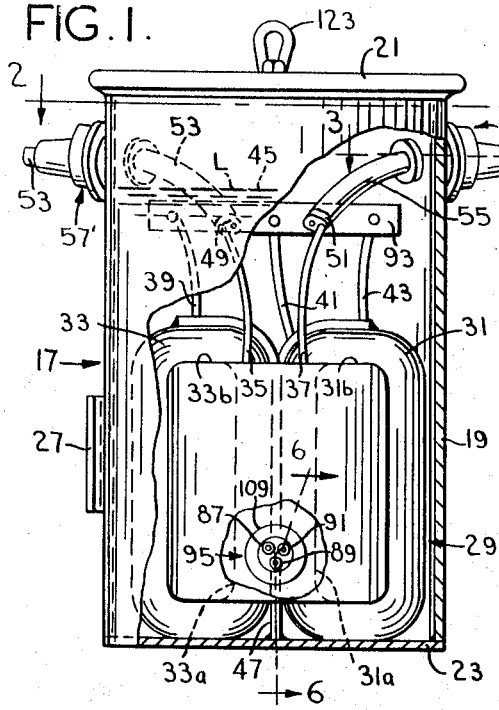
FIG. 2.
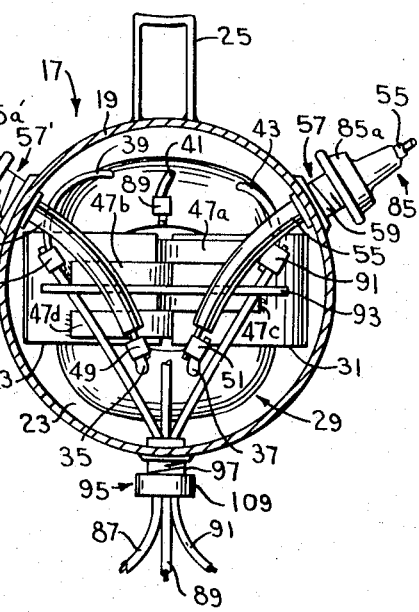
FIG. 3.
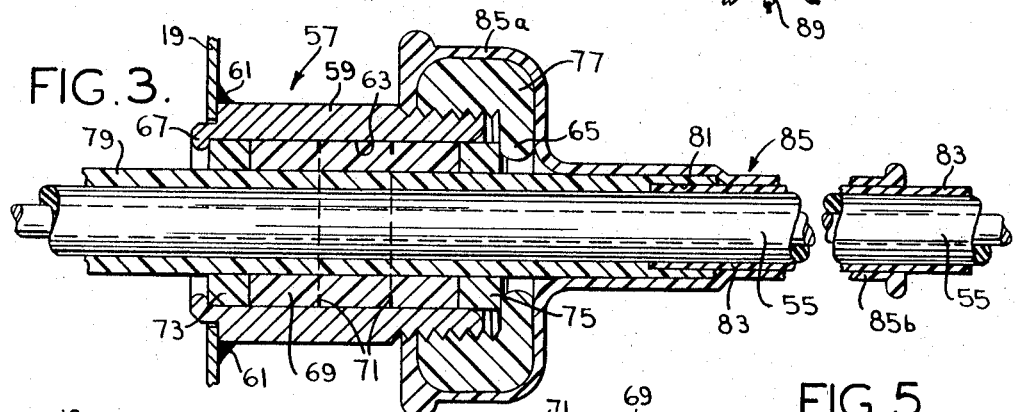
FIG. 5.
FIG. 6.
FIG. 4.
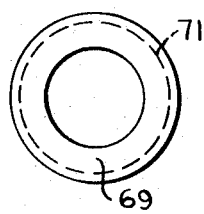
Montville B. Mallett,
William C. Reinhardt,
Inventors.
Koenig, Senniger, Powers and Leavitt,
Attorneys.

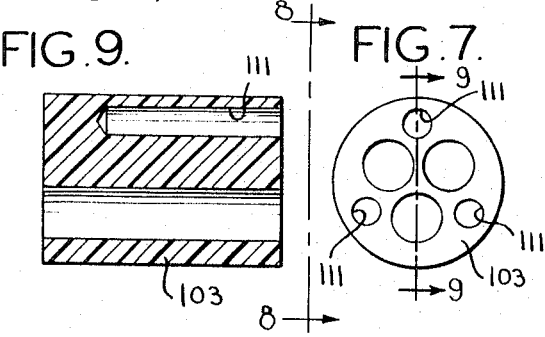
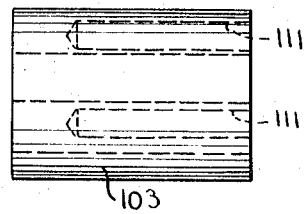
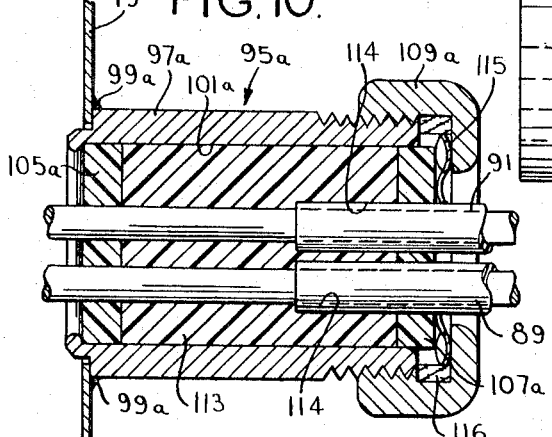
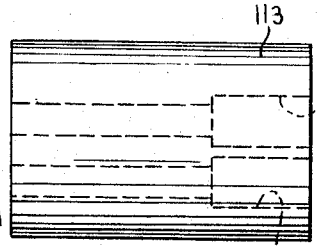
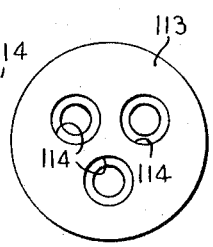
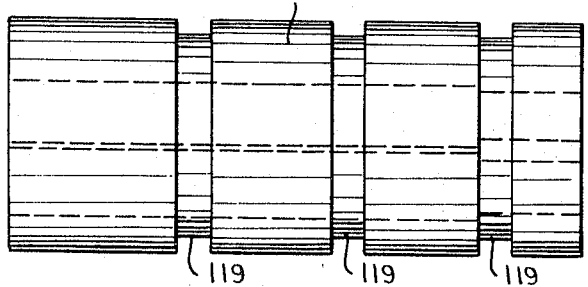
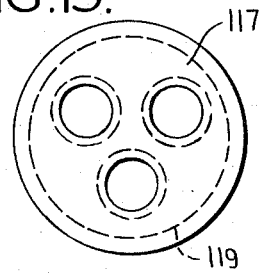

April 11, 1967  M. B. MALLETT ET AL  3,313,983
TRANSFORMERS

Filed Aug. 27, 1965    4 Sheets-Sheet 4

United States Patent Office 3,313,983
Patented Apr. 11, 1967

3,313,983
TRANSFORMERS
Montville B. Mallett, Clayton, and William C. Reinhardt, Bellefontaine Neighbors, Mo., assignors to Central Transformer Corporation, Pine Bluff, Ark., a corporation of Arkansas
Filed Aug. 27, 1965, Ser. No. 483,062
6 Claims. (Cl. 317—15)

This application is a continuation-in-part of our copending U.S. Patent application Ser. No. 320,411, filed Oct. 31, 1963, for Transformers.

This invention relates to transformers, and more particularly to improved distribution transformers.

The increasing trend of electric utilities toward closer control of operating costs has necessitated a fundamentally different approach to distribution transformer design. The costs of a unit, which include both the installation costs and the expense of maintenance, are normally the controlling factors in determining whether a particular type of transformer is to be adopted by a utility. In addition to this, however, utilities continue to demand highest quality in their equipment, selecting only those transformers which exhibit superior electrical and mechanical characteristics. The present invention is directed to low-cost distribution transformers which not only provide economic advantages to utilities, but which also possess marked advantages over prior-art distribution transformers costing considerably more.

There is also a distinct and growing emphasis on underground mounting of transformers and in the beautification of overhead construction. The present invention also provides distribution transformers which obviate the need for unsightly and hazardous externally mounted lightning arresters and which have no exposed live parts.

Among the several objects of this invention may be noted the provision of distribution transformers which arrest the long-standing trend of increasing manufacturing costs without adversely affecting product quality; the provision of distribution transformers which bring about a substantial reduction in the costs of installation and maintenance; the provision of distributon transformers which eliminate the expense and inconvenience of outages caused by birds and animals contacting exposed terminals; the provision of transformers which are completely self-contained, have no exposed live parts and provide internal lightning surge and lock-out protection; the provision of transformers of the class described which minimize the possibility of shock hazard to linemen from accidental contact with exposed transformer terminals; the provision of distribution transformers wherein primary and secondary leads may be crimped or clamped directly to a utility's cutout or cable system and which therefore eliminate at least the high voltage porcelain bushings, the tank cover complications and breakage associated with their use, and the many separate internal and external connections and jumpers necessitated by the use of such bushings; the provision of transformers of the class described in which secondary lead fittings may be located below the oil level whenever such an arrangement fits a utility's secondary line construction; the provision of distribution transformers having reduced height and weight and greatly improved appearance; and the provision of transformers which generally exhibit superior mechanical and electrical characteristics, present a clean appearance thus contributing to the beautification of overhead distribution systems, and which may be used in underground distribution systems. Other objects and features will be in part apparent and in part pointed out hereinafter.

Briefly, the above objects are achieved by providing, by means of a primary fitting, an electrically insulated path through the transformer tank wall for an insulated primary cable conductor electrically connecting a junction interior the tank with a primary line conductor exterior the tank by a completely insulated conductive path with no exposed live parts. This fitting forms and maintains a leak- and corona-proof electrical connection between the junction and the primary line conductor. The interior junction is connected to the primary winding of a core and coil unit mounted below the level of a body of dielectric fluid within the tank. In accordance with one aspect of this invention, a valve type lightning arrester is mounted within the tank and is enclosed in a hermetically sealed housing having two terminals, one of which is connected to the tank for grounding. A fuse is interconnected between the other lightning arrester terminal and the junction to provide line lock-out protection. The tank is provided with a cover to seal the tank contents including the lightning arrester from the ambient atmosphere. The primary fittings and, optionally, also low voltage fittings preferably are of the squeeze type wherein the primary (or high voltage) and secondary (or low voltage) cables constitute direct and uninterrupted leads between the transformer primary and secondary windings and the primary and secondary line conductors and wherein at least the usual high and preferably also low voltage porcelain bushings and associated fixtures with exposed live parts are eliminated. Because of this, a gasketed cover, hand hold joints and special cover insulation may be replaced by a simple, one-piece cover which preferably is welded to the tank. Special features of the cable-squeeze fitting combination insure against oil or water seepage, corona, and cable tracking. The primary fitting provides a corona- and track-free transition for each primary cable conductor as it is carried through the tank wall even where the primary line potential is in the order of 12 kv. An improved and greatly simplified method of securing the core and coil unit or assembly of the transformer within the tank contributes substantially to the elimination of internal hardware, thereby providing a simple economical integral transformer unit or structure.

In one preferred embodiment of the invention, the core and coil unit includes a vertical slot which extends throughout the length thereof, and the means for securing this unit within the tank includes a tongue which has one end secured to the bottom of the tank and which projects through this slot. This tongue has an upper marginal portion which extends beyond the top of the unit and which holds the unit captive on the tongue and firmly secured against the tank bottom.

The invention accordingly comprises the constructions hereinafter described, the scope of the invention being indicated in the following claims.

In the accompanying drawings, in which several of various possible embodiments of the invention are illustrated, FIG. 1 is a side elevation, with portions broken away, of one embodiment of this invention;

FIG. 2 is a cross-sectional view, taken on line 2—2 of FIG. 1;

FIG. 3 is an enlarged cross section taken on line 3—3 of FIG. 1 illustrating details of a primary squeeze fitting;

FIG. 4 is a side elevation of a primary squeeze fitting grommet;

FIG. 5 is an end elevation of the grommet of FIG. 4;

FIG. 6 is an enlarged cross section of the secondary squeeze fitting taken on line 6—6 of FIG. 1;

FIG. 7 is an end elevation of a secondary squeeze fitting grommet;

FIG. 8 is a side elevation of the grommet of FIG. 7, viewed as indicated on line 8—8 of FIG. 7;

FIG. 9 is a cross-sectional view, taken on line 9—9 of FIG. 7;

FIG. 10 is a cross section of an alternate embodiment of a secondary squeeze fitting;

FIGS. 11 and 12 are side and end elevations, respectively, of the secondary squeeze fitting grommet of FIG. 10.

FIG. 13 is a cross section of still another type of secondary squeeze fitting;

FIGS. 14 and 15 are side and end elevations, respectively, of the secondary squeeze fitting grommet of FIG. 13 shown in an uncompressed state;

Corresponding reference characters indicate corresponding parts throughout the several views of the drawings.

Figure 16:
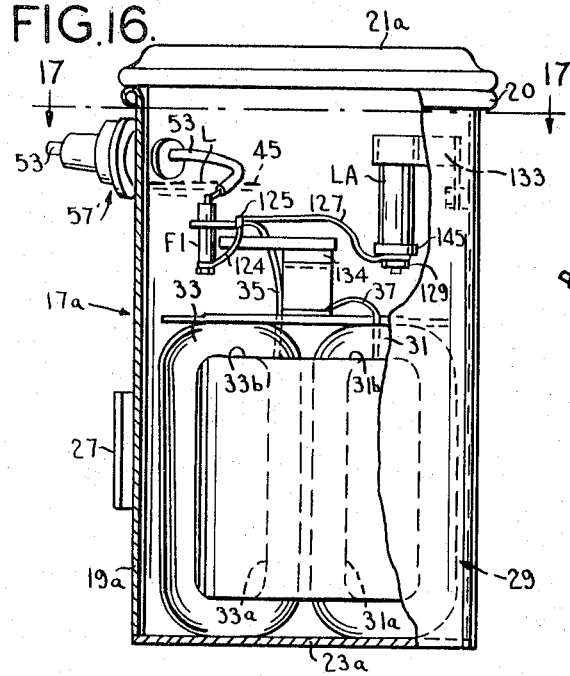
FIG. 16 is a side elevation, with portions broken away, of another embodiment of this invention.

Referring now to the drawings, a distribution transformer is illustrated as comprising a tank 17 having a side wall 19, a cover 21 and a bottom 23. A pair of mounting brackets for the transformer, one above the other, are indicated at 25; and a bracket for a name plate at 27. Positioned and secured within tank 17 is a core and coil unit or assembly 29. This assembly is of the shell type which includes primary or high-voltage and secondary or low-voltage windings concentrically wound about a generally vertical axis. These windings or coils pass through windows in a pair of wound cores 31 and 33 having two adjacent winding legs 31a and 33a around which the primary and secondary windings are wound and supported, and two upper yoke portions 31b and 33b. Core and coil unit 29 is conventional and accordingly will not be described in detail. The high-voltage leads for the primary winding are indicated at 35 and 37, while the secondary leads or terminals of the secondary winding are shown at 39, 41 and 43. Tank 17 is filled with a dielectric fluid 45 such as transformer oil to a level indicated at line L.

Core and winding assembly 29 is secured within tank 17 by a tongue or flat plate 47, one end of which is secured, preferably welded, to the central portion of the tank bottom 23. This tongue extends upwardly between the sides of the adjacent winding legs thereby forming its own slot or opening in assembly 29 between core winding legs 31a and 33a. The flaring section formed between the bottom portions of legs 31a and 33a forms a mouth which serves to guide unit 29 on tongue 47. The upper marginal portion of tongue 47 (which extends above the windings of the assembly) is cut or slit to form a plurality of fingers 47a, 47b, 47c and 47d, and this tongue is of such a gauge that these fingers are bendable to follow the contours or curvature of cores 31 and 33. Fingers 47a and 47c are bent over core 31 and preferably spot welded thereto, while fingers 47b and 47d are bent over core 33 and preferably spot welded thereto. This holds the core and coil assembly captive on tongue 47 against bottom 23. Moreover, this tongue electrically connects the two cores to the transformer tank.

Because fingers 47a–47d follow the contours or outlines of cores 31 and 33, they inherently tend to center assembly 29 within the tank. The provision of tongue 47 therefore not only serves as a simple means for holding the core and coil unit secured within the tank, but it also obviates the need of arrangements employed in prior-art transformers to insure that the core and coil unit is centered in the tank and that the cores are electrically connected to the tank.

Leads 35 and 37 of the primary winding are connected by respective crimp connectors 49 and 51 to a pair of insulated, unshielded primary cables or conductors 53 and 55. These cables, which preferably are of the extruded type, the insulation being of a synthetic thermoplastic resin such as polyvinyl chloride, are carried through two primary squeeze fittings or cable grip assemblies 57 and 57' respectively to a point exterior tank 17 where they may be crimped or clamped or otherwise directly connected to the primary lines of a utility's distribution system. Fittings 57 and 57' are preferably secured to the wall 13 of the transformer tank above the level of the fluid therein, although they may be located below the oil level if desired. Assembly 57' is identical to assembly 57 illustrated in detail in FIG. 3, and corresponding components are indicated by primed reference numerals.

Referring now to FIG. 3, cable grip assembly 57 comprises a tubular fitting or member 59 of a conductive metal (such as "Ledloy 300" steel), which projects through a hole in tank wall 19. Fitting 59 is welded to wall 19 as indicated at 61 to form a seal around the outer periphery of this fitting. Fitting 59 comprises a tubular conductive body having an axial cylindric passage or opening 63 therein. This passage has two rounded flaring transition sections, one at its outer end indicated at 65 and the other at its inner end comprising a rounded bead 67. Primary cable 55 extends or is carried through passage 63 and through an axial opening or passage in a generally cylindrical insulating grommet 69. This grommet has an outer diameter substantially equal to the inner dimension of passage 63 and is formed of a thermosetting synthetic resin, preferably a urethane synthetic resin such as that sold under the trade designation "Solithane." A specific example of a desirable grommet material is "Solithane 291" polyurethane resin vulcanized to an elastomeric or resilient state by reacting the polymer's isocyanate groups with compounds containing active hydrogen (e.g., 100 parts by weight of this resin, 2.2 parts by weight of trimethylolpropane and 1.1 parts by weight of triisopropanolamine cured at 300° F. for one hour). Such a grommet has a hardness on the Shore A scale of approximately 55 (per ASTM D 1706–61), although grommet material having hardnesses ranging from about 30 to 70 on this scale are also satisfactory. This material is relatively incompressible, has good resiliency and dielectric strength, and a compression set in the order of 7–10% (per ASTM, method B, D 395–61).

Grommet 69 is externally recessed by forming annular peripheral grooves 71 in the outer surface thereof. A retainer washer 73 of hard, substantially nonresilient, insulating material, such as that sold under the trade designation "Zytel 105," is coaxially positioned within passage 63 on the inner end of the grommet. The inner face of bead 67 constitutes a shoulder means on the inner end of passage 63 against which retainer 73 bears. A second identical retainer washer 75 is also coaxially positioned within passage 63 and bears against the outer end of grommet 69. An insulating cap 77, preferably also formed of "Zytel" is threaded on the outer end of fitting 59 to force or apply pressure against the outer end of grommet 69 via the outer retainer washer 75. It will be understood that cap 77 may be formed with an inner surface contoured to register with the outer end of grommet 69, thereby obviating the use of this retainer 75.

Grommet 69 and retainers 73 and 75 are provided with an axial passage through which the primary high-voltage cable 55 is carried. This axial passage is sized to accommodate an insulating sleeve 79 having a length somewhat greater than that of the primary squeeze fitting 57. The outer end of sleeve 79 is formed with a counterbore 81 to receive the terminal portion of a polyethylene outer cable jacket 83. The bore of sleeve 79 is otherwise sized to match the outer diameter of cable 55 without this outer jacket, and the outer diameter of sleeve 79 is substantially equal to the dimensions of the axial passage through grommet 69 and the retainers 73 and 75.

Sleeve 79 is also formed of a thermosetting resin, preferably a urethane synthetic resin, such as that sold under the trade designation "Adiprene," or, if desired, "Solithane" may also be used. A specific example of a desirable sleeve material is "Adiprene L–100" polyurethane resin cured for one hour at 300° F. with 4,4'-methylene bis (2-chloraniline) (12.5 parts by weight to 100 parts by weight of resin). Such a sleeve has a hardness on the Shore A scale of approximately 90, although sleeve material having a hardness ranging from about 80–110 is also satisfactory. This material is therefore considerably harder or stiffer and less resilient than that of the grommet material and, for example, has a typical compression set of approximately 25%.

Fitting 57 is provided with a cable boot 85 having an enlarged inner portion 85a surrounding and sealing the outer end portion of fitting 57 and a sleeve extension 85b of reduced diameter surrounding and sealing the portion of cable 53 immediately exterior the tank. Boot 85 is made of a resilient material which exhibits good corona and track resistance; for example boot 85 may be made of molded silicone rubber.

In a typical installation, cables 53 and 55 will each comprise a #4 solid copper conductor (.204" dia.) with a $\frac{5}{32}$" thick insulation coating of extruded polyvinylchloride (e.g., such as sold under the trade designation "901 Synthinol") with an outer jacket 83 of $\frac{1}{16}$" thick extruded polyethylene. Thus the cable insulation within the axial passage of sleeve 79 totals $\frac{5}{16}$" in cross section as indicated in FIG. 3 and is thermoplastic. Under typical operating conditions this large volume of cable insulation will tend to soften and deform by plastic flow, thereby causing corona-generating voids, mechanical instability, and permitting leakage of the transformer oil. In accordance with the present invention these difficulties are avoided by the squeeze fitting structure which continues to sealingly grip the cable as it becomes deformed. The squeeze fittings 57 and 57' are in effect compound squeeze fittings with two squeeze elements in series. The first element is the sleeve 79 which squeezes the cable directly and is of a relatively stiff hard thermosetting material. The second element is the grommet 69 which squeezes the sleeve and is of a relatively soft or more resilient thermosetting material compared to that of the sleeve. The physical characteristics of the sleeve therefore spreads the application of the inward radial force over substantially the entire length of the cable surrounded thereby, thus avoiding large variations in inward radial pressure on the cable being gripped. As the grommet material itself is relatively incompressible, it is recessed as shown, for example, by grooves 71, the volume of these grooves being such that under extreme cable deformation it will more than equal the volume loss of the cable insulation. Thus by compressing the grommet by tightening cap 77 so the annular grooves are closed (as shown in FIG. 3), a spring action is provided exerting a substantially even inward or centripetal pressure along the entire portion of cable 55 within the fitting so as to minimize any local deformation and continue to maintain a sealing grip on the cable, thereby stabilizing the fitting assembly under varying temperature conditions and controlling the corona level and leakage.

It will be noted that, as opening or passage 63 is cylindric, dielectric stress is reduced, thereby minimizing or eliminating corona problems. For example, the formation of corona-generating voids is avoided inasmuch as any gaps or openings would occur at the outer surfaces of the grommet and away from the cable insulation surface. In one specific embodiment of the cable lead transformer of this invention wherein fitting 59 had an approximately two-inch axial length, the corona threshold was greater than 14 kv. Because of boot 85, dirt or dust cannot collect in the high stress areas of the assembly which could otherwise lower considerably the corona threshold level. Additionally, this boot serves to protect cable 53 from tracking if arcing or electrical discharge does occur. This latter feature is important since the type of unshielded cable which may be used under oil generally has poor tracking characteristics.

Leads 39, 41 and 43 of the secondary winding of assembly 29 are connected by respective crimp connectors to three insulated secondary cables 87, 89 and 91 separated and held in place by an insulating spacer 93. These cables are carried through a secondary squeeze fitting or cable grip assembly 95 (illustrated in detail in FIG. 6) which includes a metallic tubular fitting or member 97 identical to fitting 59. This member extends through a hole in tank wall 19 and is welded as indicated at 99 to the wall to form a seal around the outer periphery of member 97. Positioned within axial passage 101 of fitting 97 is a secondary squeeze fitting grommet 103 formed from the same resilient but relatively incompressible insulating material as grommet 69. Also positioned within fitting opening 101 are two hard insulating retainers or washers 105 and 107, formed from the same material as retainers 73 and 75. Grommet 103 and retainers 105 and 107 have three axial passages therein through which are carreid the secondary cables 87, 89 and 91. A nut or cap 109 similar to cap 77, but which is preferably metallic, is threaded on fitting 97 to bear against retainer 107, thereby applying compressive forces on grommet 103, which is held between retainers 105 and 107, and forming a tight seal around cables 87, 89 and 91.

In a typical cable lead transformer of the present invention these secondary cables would be #4 solid copper conductor with a $\frac{5}{64}$" thick insulating sheath of extruded polyvinylchloride thermoplastic synthetic resin. As this wall thickness of insulation is only one half that of primary cables 53 and 55, the volume of cable insulation subject to deformation and squeeze-out is much less, and accordingly relatively hard insulating sleeves such as that indicated at 79 are not employed for secondary cables of this type. However, the same compressive spring action of the resilient grommet is utilized in this secondary fitting 95 as is utilized in the primary fittings 57 and 57', described previously. Instead of providing annular peripheral grooves as in grommet 69, grommet 103 has recesses in the form of three axial bores 111 formed in the end thereof. Under the compressive forces of tightened cap 109 these recesses are closed (as indicated in FIG. 6). The volume of these recesses is at least equal to the volume loss (in the portions of thermoplastic insulation of the secondary cable portions within the axial passages of grommet 103) which may occur under extreme conditions of deformation and squeeze-out during operation of the transformer of this invention. During transformer fabrication this restorative or compressive action of the grommets is initially preset by tightening the threaded caps 109 and 77 with a torque wrench to a preselected value so that the recesses in the grommets will be sufficiently closed to provide the described action.

Another alternative embodiment of a secondary squeeze fitting 95a is illustrated in FIGS. 10–12. This fitting is substantially identical to that illustrated and described above, except that a grommet 113 of a modified design is employed. The outer end of grommet 113 is counterbored as indicated at 114 to accommodate the insulation of secondary cables 87, 89 and 91. However, the insulation is removed from each of these cables from a point within the respective grommet passages to a point within the tank. This provides a bare metallic conductor surface for gripping by the inner portion of grommet 113. Grommet 113 is not recessed peripherally or endwise (as were previously described grommets 69 and 103). To provide the stored-up compressive forces to counteract squeeze-out of the thermoplastic cable insulation, squeeze fitting 95a is provided with a spring washer 115 of the wavy or undulating type positioned between the outer surface of a hard insulating retainer washer 107a and the inner surface of threaded cap 109a. A resilient compressible insulating washer 116 of cork or a synthetic gasketing material such as that sold under the trade designation "Corprene" is located in the annular spaced between the inner periphery of cap 109a and the outer edge of washer 115. Spring washer 115 is substantially flattened by the action of cap 109a as it is tightened on the end of fitting 97a, thus applying a continuing compressive force on grommet 113 located between hard insulating retainers 105a and 107a. Thus, a compressive force is maintained on both the thermoplastic insulation portions of cables 87, 89 and 91 within the counterbores 114 of grommet 113 and on the bared outer metallic conductor portion surfaces in the axial grommet passages, so that a good seal is maintained by the fitting 95a to compensate for any squeeze-out or plastic deformation of the cable insulation. It will be understood that, if the volume reduction of the secondary cable insulation is anticipated to exceed that which will be compensated by the compression of a single compression washer 115, two or more of such washers may be used, preferably separated by a flat washer.

A third secondary squeeze fitting 95b is illustrated in FIGS. 13–15. This fitting is substantially identical to secondary fittings 95 and 95a, but a somewhat larger grommet 117 with peripheral grooves 119 is utilized. In this embodiment, stranded conductor secondary cables 87a, 89a and 91a are employed and each is crimp-connected end-to-end by a metallic crimping sleeve 121 to a length of insulated stranded conductor secondary cable (87b, 89b and 91b), the latter preferably employing a more finely stranded conductor for greater flexibility within the tank 17. These crimp connectors 121 present lengths of hard metallic material for gripping by the central portion of grommet 117 to seal the secondary cables within the fitting 95b.

Because each of the secondary cable grip assemblies provides an effective seal at the point at which the secondary cables are brought out of the transformer tank, this assembly may be located above or below the level of the fluid in the tank. This assembly may therefore be positioned at a point most convenient to the utility employing the transformer.

It will be understood that primary cables 53 and 55 are to be directly connected by crimping or clamping to the utility's high-voltage primary line conductor (which term includes fuse cutouts or hot clamps, etc., frequently associated with the primary conductors); while secondary cables 87, 89 and 91 may also be directly connected to the utility's secondary line conductors. This eliminates intermediate jumpers and connectors such as currently employed. And since there are no exposed line parts on the transformer, risk of outages caused by birds and animals is positively eliminated. Moreover, this feature minimizes the possibility of shock to linemen from accidental contact with exposed transformer terminals.

Since the metal cover 21 which forms the top of tank 17 has no high or low voltage bushings and associated taps or fixtures, a gasketed cover having special hand-hole joints and special insulation is not required and accordingly the cover is a simple, inexpensive, one-piece cover which is preferably welded to side walls 19. A lifting eye for the transformer is attached to the center of cover 21 and indicated at 123.

Referring now to FIGS. 16–23, another distribution transformer embodiment of this invention is illustrated as comprising a tank 17a having a side wall 19a with a rolled rim 20 at the top to accommodate a gasketed cover 21a, and a bottom 23a. A conventional securing ring (not shown) seals the cover and tank. In most respects this embodiment is identical or similar to that described above, the principal differences residing in the interior mounting of a lightning arrester LA, a fuse F1, and the secondary fittings. Also, a single high voltage or primary fitting 57' is utilized, the inner end of insulated primary cable conductor 53 being connected to an electrical junction J interior the tank. Junction J constitutes the upper terminal of a fuse F1, the other or lower terminal of F1 being connected by a short jumper conductor 124 to another junction 125. High voltage lead 35 of the primary winding is interconnected at 125 and another conductor 127 serves to commonly interconnect terminal 125 to the lower terminal 129 of arrester LA. The other or upper terminal 131 of arrester LA is mechanically and electrically secured to the grounded tank 17a by means of a bracket 133. The other high voltage primary lead 37 is grounded as illustrated by connection to the transformer core. Fuse F1 and junction 125 are rigidly secured to the core and coil unit by means of an insulating bracket 134.

Lightning arrester LA is of the valve type and includes several valve elements 135 and a gap structure 137 which combines both the arrester coil and gap functions. The elements 135 and 137 are maintained under compression by means of a spring and copper shunt 139. The arrester components are hermetically sealed in an insulating housing 141 of porcelain or the like, by means of end cap terminals 131 and 145, which are soldered to the housing 141.

The secondary winding leads 39 and 43 are connected respectively to two terminals 145 and 147 of a terminal strip 149. Two leads 41a and 41b of two sections of the low voltage winding are commonly connected to a third terminal 151 of strip 149. Rather than using a single secondary squeeze fitting 95 to carry secondary cables through tank sidewall 19a, separate secondary fittings 95a are utilized. Also, the insulated secondary cable conductors 87a, 89a and 91a employed in this embodiment are constituted by generally S-shaped heavy copper rods 153 insulated, for example, with a thin sleeve of heat shrinkable vinyl resin tubing 155. A secondary squeeze fitting grommet 156, similar to the grommet illustrated in FIG. 4, but having three peripheral annular grooves 158 (shown compressed to a closed condition in FIG. 22) provides a leak-proof insulating seal for each of the secondary cable conductors, when the grommet is compressed between retainers 105a and 107a by tightening cap 109.

Figure 17:
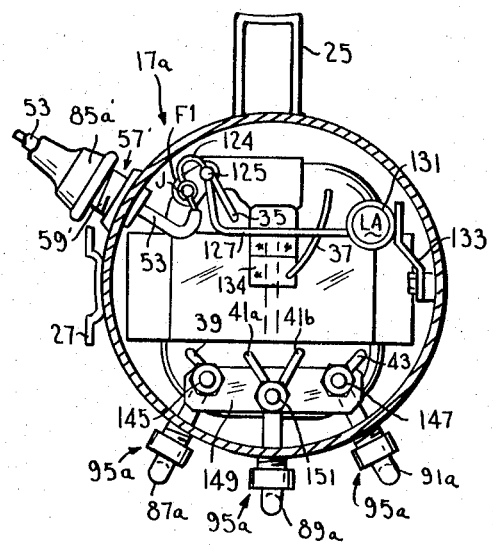
FIG. 17 is a cross-sectional view taken on line 17—17 of FIG. 16.
Figure 18:
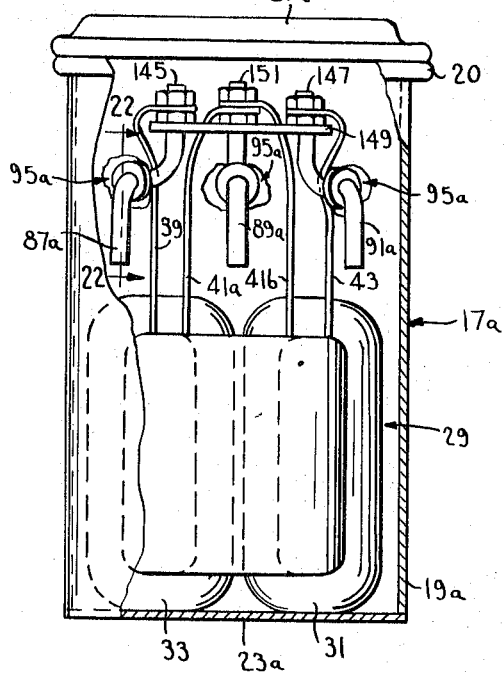
FIG. 18 is another side elevation similar to that of FIG. 16, but with different portions broken away so as to more particularly illustrate the secondary fittings.
Figure 23:
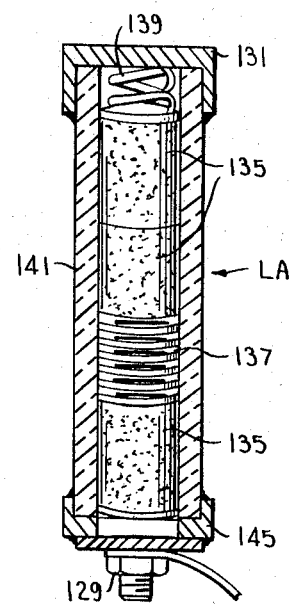
FIG. 23 is an enlarged elevation of the lightning arrester component of FIGS. 16 and 17 with parts broken away.
Figure 19:
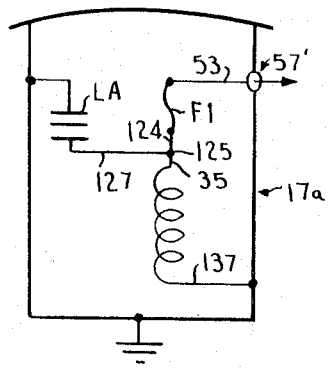
FIGS. 19–21 are schematic circuit diagrams illustrating three exemplary interconnection arrangements of the high voltage winding, lightning arrester and fuse components utilized in transformers of this invention.

The circuit diagram of the transformer of FIGS. 16–18 is illustrated schematically in FIG. 19, the core and secondary windings being omitted. In the event of any lightning or other overvoltage surge, arrester LA will function to provide a low resistance discharge path to ground via the tank 17a, thereby conducting this otherwise damaging transient energy to ground without significant damage to the core and coil unit, the distribution system, or to the arrester itself. As no significant amount of gases is generated during operation of the arrester, no exterior venting is necessary and the sealed transformer will continue to operate without contamination of the dielectric. Fuse F1, preferably immersed in the transformer oil 45, is sized to protect both the core and coil unit in the event of overload and the distribution system in the relatively rare instance where the arrester LA may be damaged by an excessive surge and break down. To avoid the resulting short-circuiting of the distribution system to which this transformer is connected, fuse F1 will operate to open the circuit through the then shorted arrester to ground and prevent line lock-out.

Figure 20:
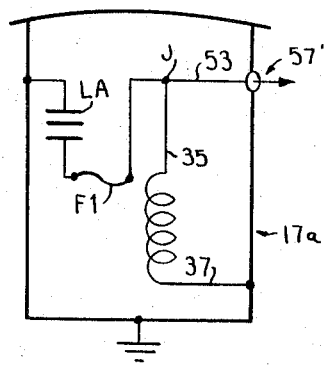
Figure 21:
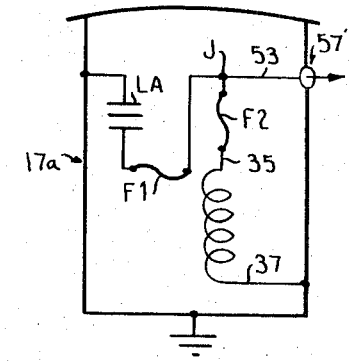
Figure 22:
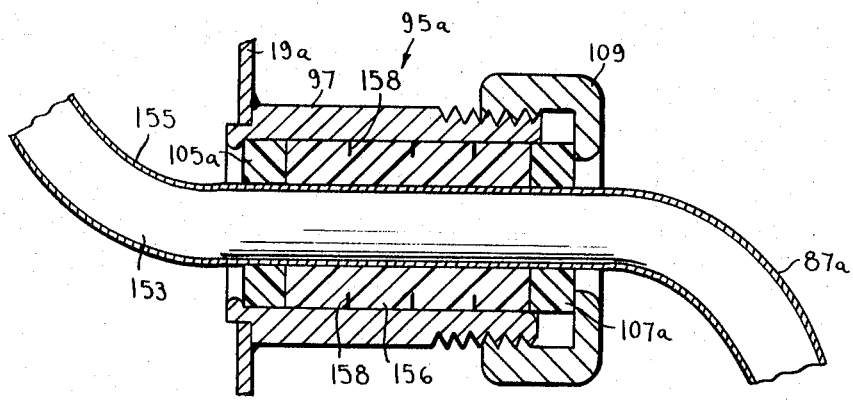
FIG. 22 is an enlarged cross section of a secondary fitting taken on line 22—22 of FIG. 18.

An alternate interconnection of fuse F1 is illustrated schematically in FIG. 20. Instead of commonly electrically connecting fuse F1 between junction J and both the primary winding and the arrester (as in FIG. 19), lead 35 is directly connected to junction J. Fuse F1 then protects solely against line lock-out in the unusual instance where the arrester LA should fail. In FIG. 21 a second fuse F2 is electrically connected between junction J and the primary winding thereby serving the function of protecting the core and coil unit against overload, while fuse F1 will prevent line lock-out in the event of arrester failure. It will be noted, therefore, that in each instance the ratings of the fuse F1 (and also F2 in FIG. 21) are coordinated with the ratings of the transformer and the distribution system parameters.

It will be understood that complete self-protection of the distribution transformer of this invention may be conveniently provided by inclusion within the tank of the usual low-voltage breakers. As the overall size of this transformer is not increased by inclusion of the lightning arrester LA and fuses, neither will the addition of breakers require any size modification. It will also be noted that where installation of the transformer is to be underground and moisture or water immersion problems are anticipated, the primary cable conductors may be of the shielded type, thereby minimizing any significant voltage gradients in the interconnection between the primary line conductor and the point of entry into the tank of the primary line conductor. In no event are there any exposed live parts at line terminations or switching points and the lightning arrester is protected from the elements, moisture and airborne contaminants, and the possibility of breakage.

In view of the foregoing it is seen that this invention provides distribution transformers, either for pole-hung or underground installation, which are inherently different from and considerably less expensive than transformers of this type now being employed. Moreover, these transformers possess substantial advantages over prior-art transformers: They have a reduced height and weight, and a less cluttered and therefore more pleasing appearance. They may be interconnected in a distribution system without the need of intermediate jumpers or connectors. The secondary conductors or cables may be brought out of the tank at a point which best serves a utility's convenience. And finally, the transformer of this invention is considerably safer and less likely to be the cause of outages than units employing exposed taps and bushings.

At present, the range of application for the transformer of this invention is 5 through 25 kva., 2.4 through 12 kv. primary, 120/240 v. three-wire secondary. Tests have indicated, however, the feasibility of considerably extending the range of application of this transformer. It will be noted that a principal feature and advantage of the present invention, i.e., the elimination of high-voltage bushings, may be retained and other substantial benefits derived from this invention even if the low-voltage fittings such as 95, 95a and 95b are not employed, but conventional bushings are used for the low-voltage or secondary cables.

It will be understood that if the transformers of this invention are to be employed in distribution systems wherein only one primary lead is required (i.e., in systems wherein one side of the primary winding is connected internally to the tank which is grounded) only one primary squeeze fitting will be required. Also, it will be understood that in some applications it will be desirable to carry the primary or secondary cables through the top of tank 17, i.e. through cover 21, in which case the appropriate squeeze fittings would extend through this cover. Further, it will be noted that elastomeric materials other than urethanes (e.g., fluorohydrocarbon materials such as that sold under the trade designation "Viton" and other synthetic rubber or elastomeric materials such as neoprene and buna-N, which are compatible with the dielectric fluid under the temperature ranges of transformer operation) may be utilized in the fabrication of the grommets and sleeves of these primary and secondary fittings.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A distribution transformer for interconnection to a primary line conductor comprising a tank containing a dielectric fluid, a core and coil unit located within said tank below the level of said fluid, said unit including a primary winding and a secondary winding, means for securing said unit within said tank, an electrical junction within said tank connected to the primary winding, said tank having at least one primary fitting providing an electrically insulated path through the tank for an insulated primary cable conductor electrically connecting said junction interior said tank to said primary line conductor exterior said tank by a completely insulated conductive path with no exposed live parts, said fitting forming and maintaining a leak- and corona-free electrical connection between the junction and the primary line conductor, a valve type lightning arrester, a hermetically sealed housing enclosing said arrester and having two lightning arrester terminals, the housing and lightning arrester assembly being mounted within said tank, one of said terminals being connected to said tank for grounding, a fuse interconnected between the other of said arrester terminals and the junction, and a cover for said tank sealing said tank and the lightning arrester and housing assembly from the ambient atmosphere.

2. A transformer as set forth in claim 1 wherein said fuse is commonly electrically connected between said junction and both said primary winding and said other arrester terminal.

3. A transformer as set forth in claim 1 wherein said electrical junction and said primary winding are directly interconnected.

4. A transformer as set forth in claim 1 which includes a second fuse electrically connected between said junction and said primary winding.

5. A transformer as set forth in claim 1 in which said primary fitting is a squeeze fitting, and said primary cable conductor is unshielded and is carried through said squeeze fitting to form and maintain a seal between the cable and said tank.

6. A transformer as set forth in claim 5 which further includes at least two insulated secondary cables and two secondary squeeze fittings, each of said secondary cables being carried through a respective fitting for interconnecting said secondary winding to respective secondary line conductors exterior said tank, said secondary squeeze fittings forming and maintaining leak-free insulated electrical connections between said secondary winding and said secondary line conductors.

References Cited by the Examiner
UNITED STATES PATENTS

| | | | |
|---|---|---|---|
| 1,923,727 | 8/1933 | Hodnette | 317—15 |
| 2,145,375 | 2/1939 | Schultz | 317—14 X |
| 2,971,132 | 2/1961 | Nash | 317—66 |
| 3,218,517 | 11/1965 | Sankey | 317—66 |

MILTON O. HIRSHFIELD, *Primary Examiner.*

J. D. TRAMMELL, *Assistant Examiner.*